United States Patent [19]

Woodward

[11] 3,770,898

[45] Nov. 6, 1973

[54] CALLED LINE STATUS TESTING CIRCUIT

[75] Inventor: John W. Woodward, Schaumburg, Ill.

[73] Assignee: GTE Automatic Electric Laboratories, Incorporated, Northlake, Ill.

[22] Filed: June 5, 1972

[21] Appl. No.: 259,642

[52] U.S. Cl. .............................................. 179/18 AB
[51] Int. Cl. .............................................. H04q 3/48
[58] Field of Search ....................... 179/18 AB, 18 H

[56] References Cited

UNITED STATES PATENTS 1,628,358 5/1927 Friendly ........................... 179/18 H

*Primary Examiner*—William C. Cooper
*Attorney*—K. Mullerheim et al.

[57] ABSTRACT

A called line status testing circuit for detecting and selectively responding to the status of a called line in a telephone system, the circuit including three relays and means for detecting either (1) an unassigned terminal; (2) an idle terminal; (3) a busy terminal; or (4) a reverting call condition of the called line and selectively operating the three relays to indicate the detected line condition, said detecting and indicating operations being performed simultaneously in a single step.

5 Claims, 4 Drawing Figures

CALLED LINE STATUS TESTING CIRCUIT

This invention relates to telephone switching equipment and in particular to apparatus for detecting and selectively responding to the status of a called line.

Reference may be made to U.S. Pat. Nos. 1,045,306; 2,218,851; 2,591,580; 3,251,929; 3,301,963; and 3,573,383 which illustrate various telephone line testing systems in the prior art.

It is common practice to provide apparatus known as a marker at the terminating stage of an established telephone line connection in order to, among other operations, test the status of the called line at the terminating stage and provide a corresponding indication or mark of such status. Normally, the marker sequentially checks the status of the called line during its line test operations, testing for the following possible conditions:

1. unassigned terminal;
2. terminal idle;
3. terminal busy; or
4. reverting call.

In order to perform such tests the marker includes a corresponding amount of sequencing apparatus which conventionally performs the test operations in two sequences—the first sequence including a busy idle check with associated apparatus, and the second sequence including a revertive call check with associated apparatus if the called line was found busy in the first sequence. Many systems also require all of the unassigned terminals to be strapped or connected together either to prevent their appearance during the test operations as an otherwise idle terminal or to provide a common path to an intercept or recorded announcement trunk. This becomes time consuming and burdensome, particularly in large systems where there may be many unassigned terminals.

SUMMARY OF THE INVENTION

In accordance with the principles of the present invention, apparatus is provided for simultaneously performing all of the status check operations in only one step during the called line test cycle of the marker unit. Thus, in only one step, the apparatus of this invention detects and responds to any of the aforementioned called line conditions (1) to (4). Since there is no need for a sequential checking operation, this results in a significant reduction in the amount of sequencing equipment required and a reduction in the time required for the marker called line test cycle. As an example, in using the one step called line testing apparatus of this invention the time required is reduced by about 50 percent. In addition, with the apparatus of this invention, the strapping of all unassigned terminals is not required.

BRIEF DESCRIPTION OF THE DRAWINGS

FIGS. 1–4 illustrate the apparatus of the present invention as used for simultaneously testing in a one step operation the various possible conditions of the called line, wherein:

FIG. 1 illustrates an unassigned terminal condition;

FIG. 2 illustrates a terminal idle condition;

FIG. 3 illustrates a terminal busy condition; and

FIG. 4 illustrates a reverting call condition.

DETAILED DESCRIPTION

Figure 1:
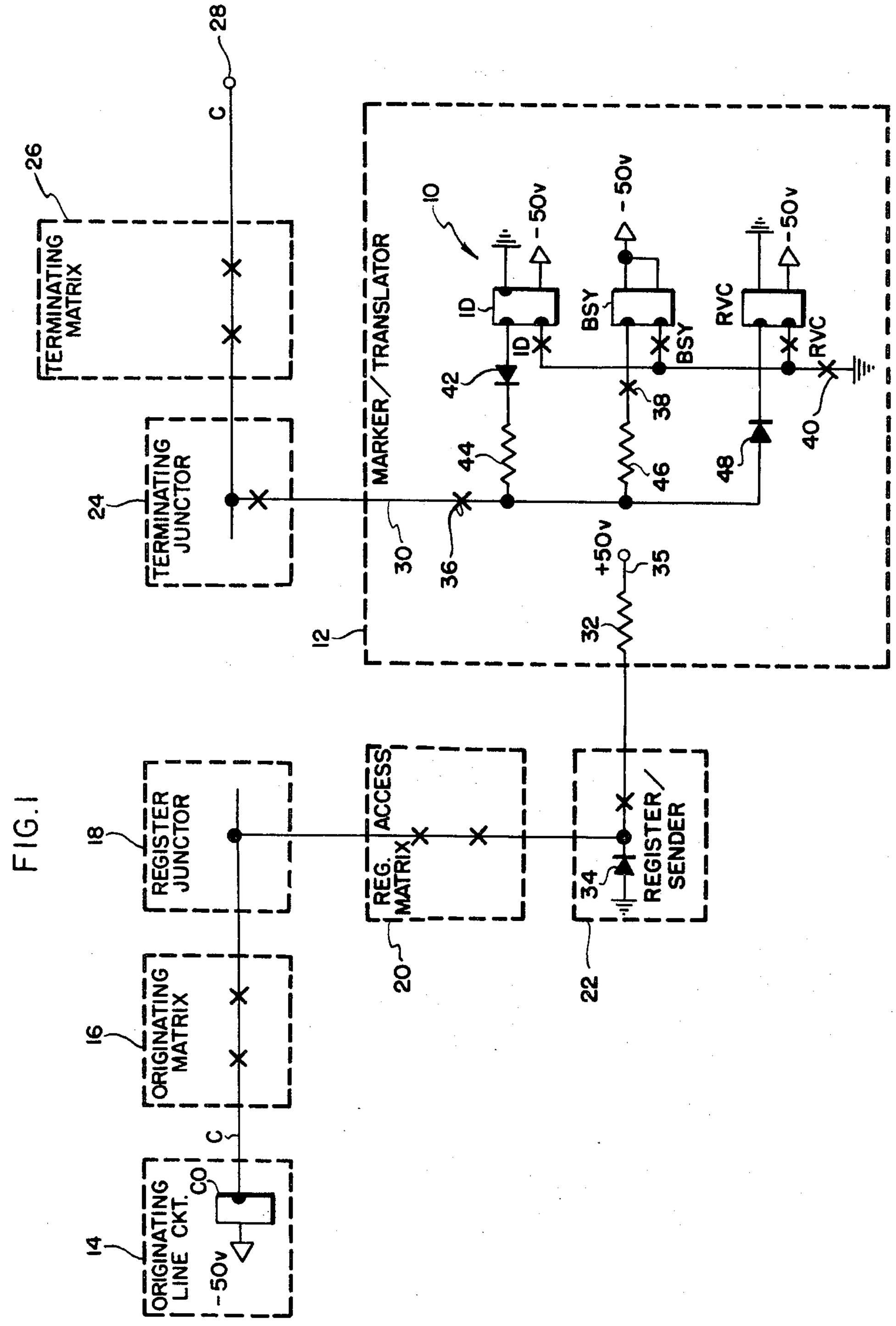

Referring now to FIGS. 1–4, there is illustrated a specific embodiment of the invention as utilized in connection with a telephone exchange system of the terminal-per-station type. This type of telephone exchange system includes party-line telephones which share a line circuit and are assigned a terminating matrix appearance per telephone, and therefore each telephone has a different directory number. The illustrated control lead or "C-lead" is a conductor lead. Each C-lead respectively passes through each switching matrix parallel to the two wire speech transmission path. For convenience in illustrating the principles of the present invention, the two wire speech transmission path has not been shown in FIGS. 1–4 although its connections are well known in the art. The primary function of each C-lead is to hold the associated switching matrix path operated until either the calling or the called party hangs up. Such a path is held operated by a ground condition on the C-lead, thus a ground C-lead on a matrix terminal indicates that the associated line circuit is busy.

The speech transmission wires and the C-leads of all terminals connected to one line circuit are connected together, so that for a party line, if the line circuit is busy, all the associated connected terminals appear busy to an incoming call. Furthermore, these same transmission wires and C-leads are connected to a single appearance on the originating side of the associated matrix so that all parties connected together to one line circuit may originate as well as receive calls. The C-lead connected to each line circuit at the called terminal is connected to the respective line circuits CO relay, which is connected to negative battery (−50 volts).

As illustrated in each of the FIGS. 1–4, the called line status testing circuit 10 is included within an associated marker/translator 12. The marker/translator 12 has access to the C-lead of the originating line circuit 14 via the originating matrix 16, register junctor 18, register access matrix 20 and a register/sender 22. It is to be understood that the illustrations of FIGS. 1–4 schematically illustrate the various known equipment such as the originating line circuit 14, the originating matrix 16, etc., and only that portion thereof which is pertinent for illustration of the present invention has been shown. Furthermore, the "detached contacts" technique for illustrating relay contacts has been used in these illustration, it being understood that the designation of the relay contacts refers to the associated relay winding.

When processing a local terminating call, the marker/translator 12 provides a conductive path through a terminating junctor 24 and a terminating matrix 26 to the called terminal. The control lead or C-lead at the called terminal 28 is extended through the terminating matrix and junctor into the marker/translator 12 as represented by lead 30. The marker/translator 12 thus has access to the C-lead of both the originator and the terminator.

An off-hook condition at the originating line circuit followed by the dialing of digits completes a conductive path through originating matrix 16, register junctor 18, register access matrix 20, and register/sender 22 to seize the marker/translator. The marker/translator provides a positive voltage (+50 volts) via a resistor 32 to the C-lead in the register/sender. This positive voltage overrides the ground supplied by the register/sender and results in a positive voltage appearing at the C-lead of the originating line circuit. The ground provided by the register/sender to maintain the conductive path back to the originator is supplied via a diode 34. It is to be noted that the anode of the diode 34 is connected to ground and the cathode is connected to the positive voltage supplied through the marker/translator and lead 35, thus the diode 34 prevents a short to ground of the positive voltage applied to the C-lead.

The marker/translator 12 is seized by the register/-sender 22 as is conventional, and the open contact 36 is closed so as to complete a path from the C-lead of called terminal 28 through terminating matrix 26 and terminating junctor 24 back into the marker/translator 12. Seizure by the register sender 22 also closes contacts 38, 40. The terminating C-lead extended into the marker/translator is connected in the marker/translator to the called line status testing circuit 10 in accordance with the principles of the present invention. In line status testing, circuit 10 may encounter any one of the four different conditions at the called terminal. The following description associated with the respective FIGS. 1–4 illustrates such conditions and the principles of the present invention involved in the simultaneous testing by the circuit 10 of all such conditions.

FIG. 1 illustrates the status checking of an unassigned terminal. Thus, as noted in FIG. 1, the C-lead terminal 28 at the terminating matrix outlet is an open circuit. Although current flows in series through the windings of relays ID and BSY (via diode 42, resistors 44, 46 and the operated contact 38), the component values of resistors 44 and 46 are chosen such that the current is below the minimum operating current for both relays. It is evident that relay RVC also will not operate since diode 48 is reverse biased and blocks the negative voltage present via relay BSY. Therefore, when an unassigned terminal condition is encountered, none of the circuit 10 relays ID, BSY, or RVC operate.

Figure 2:
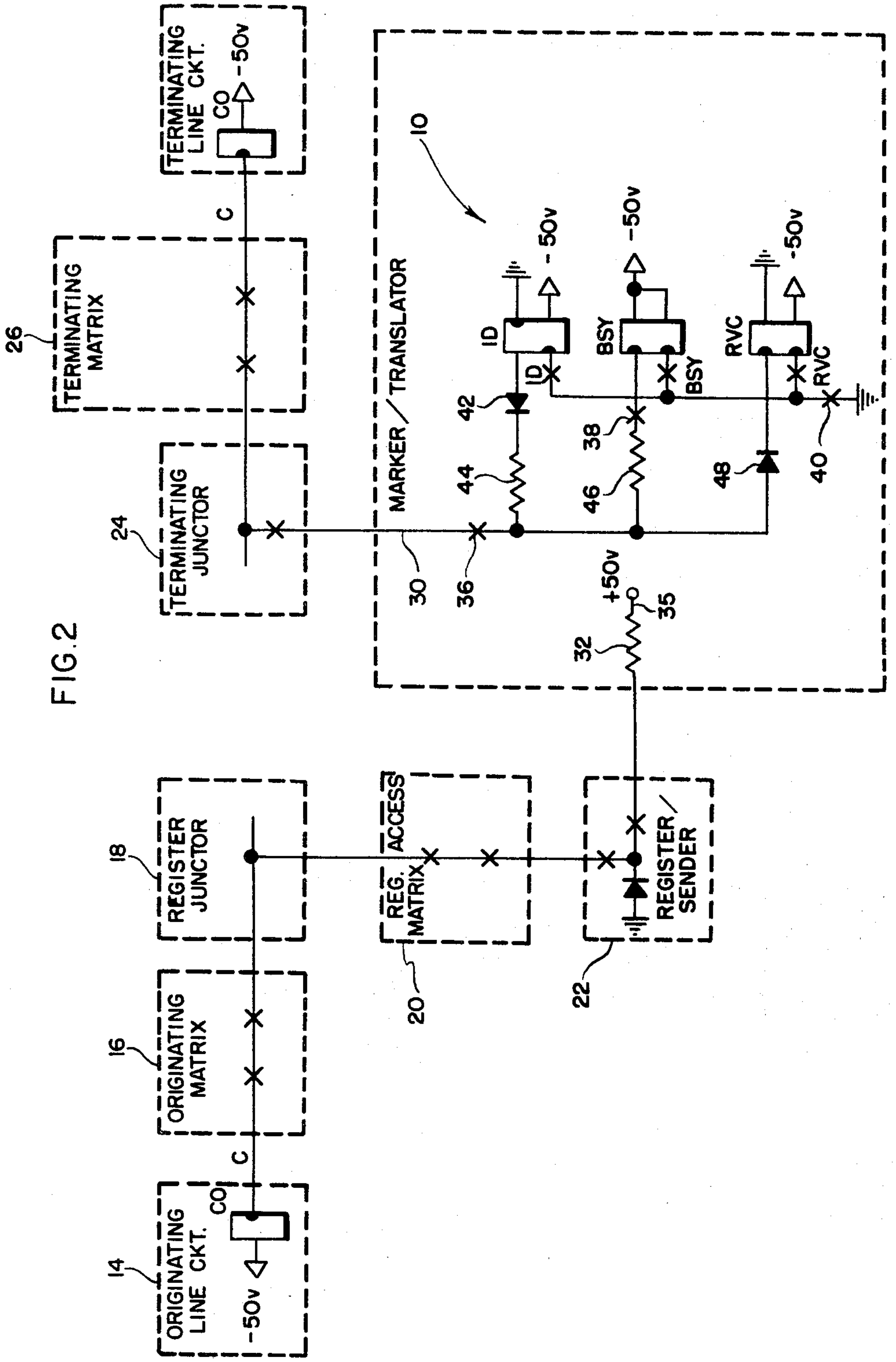

FIG. 2 illustrates a terminal idle condition at the C-lead terminal 28 which can be detected by the circuit 10. The terminating C-lead path connected to the negative battery is of course extended back into the marker/translator and connected to the circuit 10 via lead 30. Sufficient current flows through the terminating line circuit relay CO and relay ID in series to operate relay ID. Relay ID locks up through its own contact ID and will only be released when the marker/translator is released thereby opening contact 40. Relay BSY does not operate because negative battery appears at both ends of its winding. Similarly, relay RVC does not operate because diode 48 is reverse biased and blocks the negative battery from the grounded side of the relay RVC winding.

Figure 3:
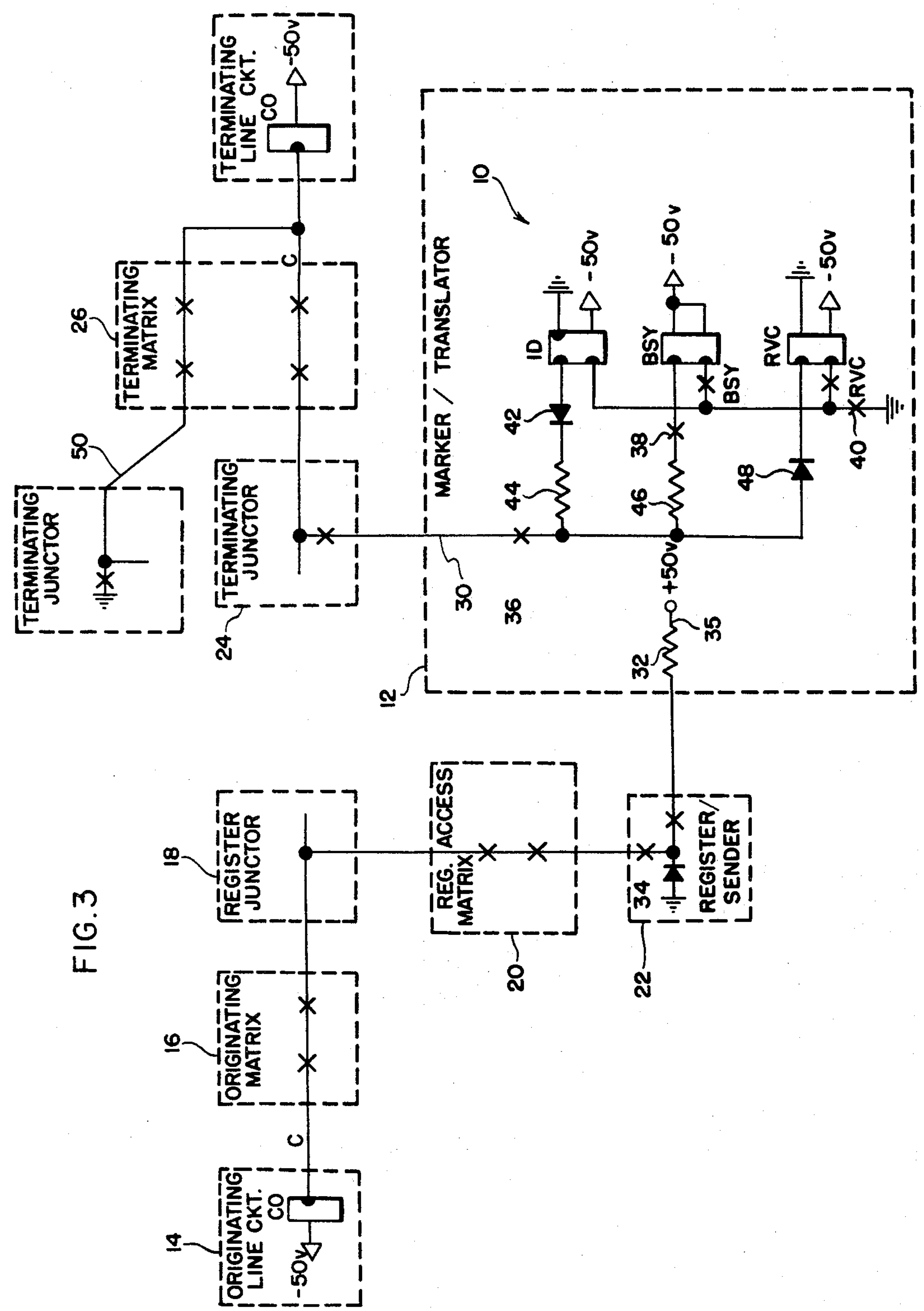

FIG. 3 illustrates the circuit 10 during a called line status checking cycle in which the called line is in the "terminal busy" condition. As can be seen in FIG. 3, ground potential is supplied from line 50 via another matrix path to the C-lead terminal 28. Relay BSY operates since the associated relay windings are provided with a negative battery on one side thereof and ground potential from line 50 on the other side thereof. Relay BSY locks up through its contact BSY and associated winding. Relays ID and RVC remain unoperated since the opposite sides of each associated winding are connected to ground potential.

Figure 4:
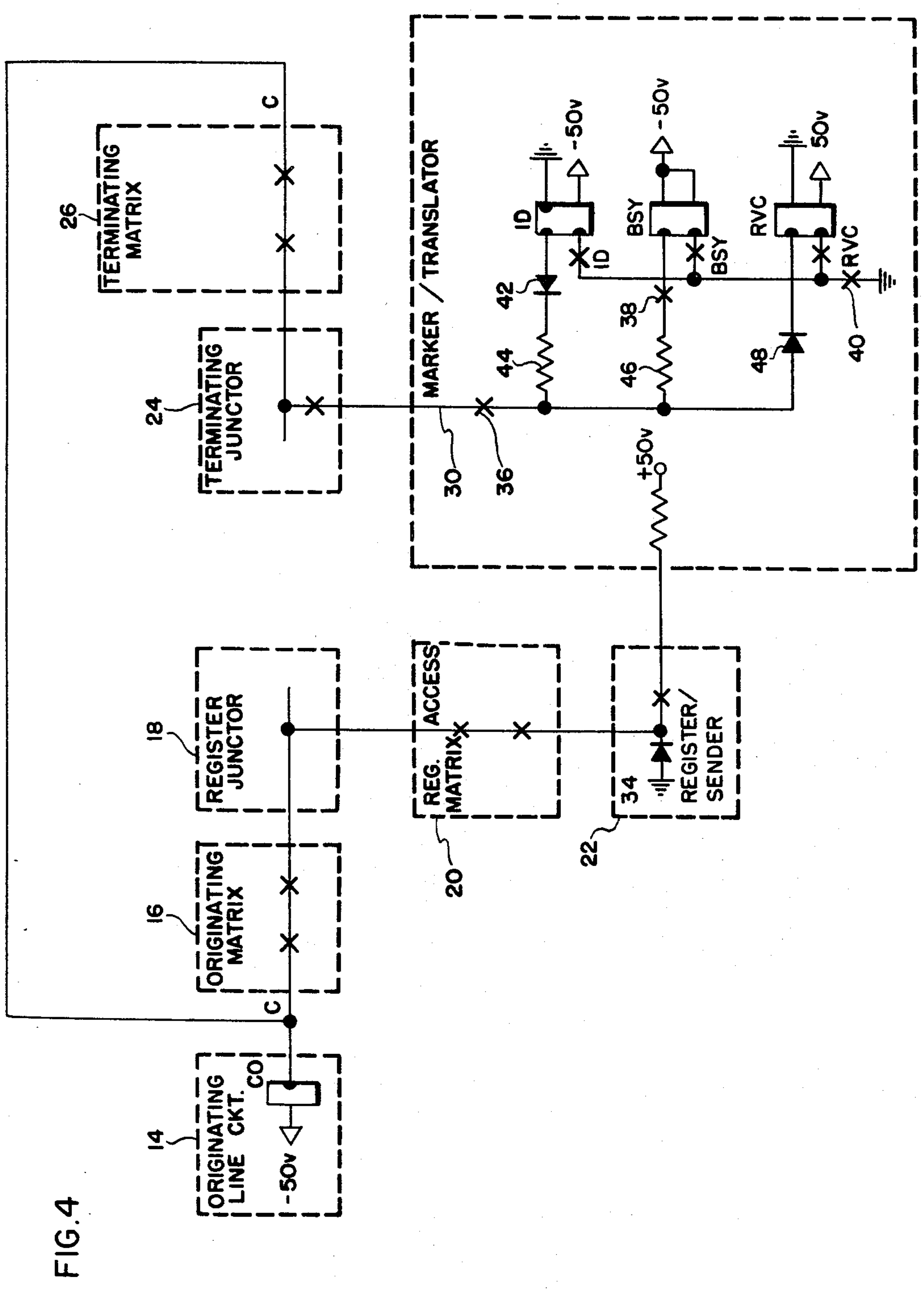

FIG. 4 illustrates the circuit 10 during the called line status checking cycle when the called line is associated with a reverting call. This occurs when the calling and the called party are both subscribers on the same party line. As shown in FIG. 4, the originating and the terminating line circuits are one and the same, thus the positive potential sent to the originating line circuit through resistor 32 appears on the terminating matrix terminal C-lead which is in turn connected to lead 30 and the circuit 10. Since a positive voltage appears on the anode of diode 48 connected to one side of relay RVC winding, and the other side of the winding is ground connected, relay RVC operates and locks up through its contact RVC. Similarly, relay BSY operates with positive potential and negative battery on respective sides of the associated relay winding. Relay BSY locks up through its contact BSY. The diode 42 is in a reverse biased blocking condition and prevents relay ID from operating.

The circuit 10 performs any one of the operations described in connection with FIGS. 1–4 depending upon the condition of the called line. Thus, in effect the circuit simultaneously performs all of these test functions in only one step. The resulting effect on circuit 10 in response to the detected condition of the called terminal is a follows:

1. unassigned terminal—neither relays ID, BSY, nor RVC operate;
2. terminal idle—only relay ID operates;
3. terminal busy—only relay BSY operates;
4. reverting call—only relays RVC and BSY operate.

The condition of relays ID, BSY and RVC in response to a particular detected condition of the called line operates associated contacts of these relays so as to direct subsequent actions of the marker/translator. If none of the relays in circuit 10 are operated, an unassigned terminal is connected to an announcement trunk. If the called line was in an idle condition the marker/translator signals the register/sender 22 for terminating junctor 24 to complete the transmission path through the office. If the called line was a busy condition, the marker/translator releases the path through terminating matrix 26 and connects the call to a busy bridge. If the call was reverting, a new path through terminating matrix 26 is established via a reverting call junctor.

On completion of a call, the marker/translator is released thereby releasing relays associated with contacts 38 and 40. The contact 38 in series with resistor 46 and the winding of relay BSY insures the release of relays BSY and ID, since although the quiescent current is below the minimum operating current of both relays, the quiescent current may be sufficient to hold in an operated condition an already operated relay. It is to be noted that relay contact 40 is in series with the lock up paths of each of the relays ID, BSY and RVC so that when the marker/translator is released the lock up path previously established is released.

The foregoing detailed description has been given for clearness of understanding only, and no unnecessary limitations should be understood therefrom as modifications will be obvious to those skilled in the art.

What is claimed is:

1. A telephone system including an originating line circuit; an originator control lead extending from said originating line circuit; a plurality of called line terminations which may be in any one of the following line conditions—(1) unassinged, (2) idle, (3) busy, or (4) reverting call; a plurality of termination control leads extending respectively from each of said called line terminations; and each said termination control lead being at a predetermined electric potential related to the condition thereof;

the improvement comprising called line testing means including circuit means for detecting the potential of said lines at selected terminations and means for coupling said circuit means to said originator control lead and to the termination control lead at said selected termination, said circuit means comprising, first, second and third relay means connectable to the termination control lead at said selected termination for responding to the associated called line condition;

said relay means each including respective relay windings; and means coupled respectively to said relay windings for selectively operating said relay means in response to the potential on said called line as follows 2. unassigned—first, second, and third relay means non-operated;

2. idle—first relay means operated, second and third relay means non-operated;

3. busy—second relay means operated, first and third relay means non-operated; and 4. revertive call—second and third relay means operated, first relay means non-operated.

2. A telephone system as claimed in claim 1, each of said relay means including respective lockup relay contacts and lock-up relay windings coupled thereto, said lock-up relay contacts actuable upon operation of the respective relay means in response to the associated line condition (1) through (4) for maintaining said respective relay means operated through said coupled lock-up relay windings.

3. A telephone system as claimed in claim 1, wherein said termination control lead is at a negative potential when in said idle condition, and at a positive potential when in said revertive call condition, and said respective means coupled to the relay winding of said first relay means includes a diode, means for connecting said diode in series with said winding to forward bias said diode in response to said called line being in said idle condition for operating said first relay means, and to reverse bias said diode in response to said called line being in said revertive call conditon for preventing operation of said first relay means.

4. A telephone system as claimed in claim 3 wherein said termination control lead is an open circuit when in said unassigned condition, and said respective means coupled to the relay winding of said third relay means includes a diode, means for connecting said diode in series with said winding to forward bias said diode in response to said called line being in said revertive call condition for operating said third relay means, and to reverse bias said diode in response to said called line being in said unassigned and idle conditions for preventing operation of said third relay means.

5. A telephone system as claimed in claim 4, wherein said respective means coupled to said first and second relay windings includes impedance means connected in series with said windings for preventing operation of said first and second relay means in response to said called line being in said unassigned condition.

* * * * *

UNITED STATES PATENT OFFICE

CERTIFICATE OF CORRECTION

Patent No. 3,770,898 Dated November 6, 1973

Inventor(s) John W. Woodward

It is certified that error appears in the above-identified patent and that said Letters Patent are hereby corrected as shown below:

Column 4, line 66, change "unassinged" to read -- unassigned --

Column 5, line 21, change "2" to read -- 1 --

Signed and sealed this 2nd day of April 1974.

(SEAL)
Attest:

EDWARD M.FLETCHER,JR.
Attesting Officer

C. MARSHALL DANN
Commissioner of Patents